(12) United States Patent
Milazzo et al.

(10) Patent No.: US 10,063,529 B2
(45) Date of Patent: Aug. 28, 2018

(54) SECURE 3D MODEL SHARING USING DISTRIBUTED LEDGER

(71) Applicant: Accenture Global Solutions Limited, Dublin (IE)

(72) Inventors: Andrea Maria Milazzo, Sophia Antipolis (FR); Giuseppe Giordano, Juan les Pins (FR); Emmanuel Viale, Cagnes sur Mer (FR); Luca Schiatti, Juan les Pins (FR)

(73) Assignee: Accenture Global Solutions Limited, Dublin (IE)

( * ) Notice: Subject to any disclaimer, the term of this patent is extended or adjusted under 35 U.S.C. 154(b) by 175 days.

(21) Appl. No.: 15/082,696

(22) Filed: Mar. 28, 2016

(65) Prior Publication Data

US 2017/0279783 A1 Sep. 28, 2017

(51) Int. Cl.
| | | |
|---|---|---|
| *G06F 21/00* | (2013.01) | |
| *H04L 29/06* | (2006.01) | |
| *G06F 21/10* | (2013.01) | |
| *G06Q 20/38* | (2012.01) | |
| *H04L 9/14* | (2006.01) | |
| *B29C 64/00* | (2017.01) | |

(Continued)

(52) U.S. Cl.
CPC ............ *H04L 63/061* (2013.01); *B29C 64/00* (2017.08); *B29C 64/386* (2017.08); *B33Y 50/00* (2014.12); *G06F 21/10* (2013.01); *G06Q 20/3829* (2013.01); *H04L 9/0825* (2013.01); *H04L 9/14* (2013.01); *H04L 63/0435* (2013.01); *H04L 63/0442* (2013.01); *H04L 63/06* (2013.01); *G06Q 20/401* (2013.01)

(58) Field of Classification Search
USPC .......................................... 713/168, 169, 171
See application file for complete search history.

(56) References Cited

U.S. PATENT DOCUMENTS

| | | | | |
|---|---|---|---|---|
| 2014/0156053 A1* | 6/2014 | Mahdavi | ............. | B29C 67/0059 700/119 |
| 2015/0134955 A1 | 5/2015 | Lacaze et al. | | |

(Continued)

OTHER PUBLICATIONS

European Extended Search Report for Application No. 17160522.3, dated Jul. 26, 2017, 8 pages.

(Continued)

*Primary Examiner* — David J Pearson
(74) *Attorney, Agent, or Firm* — Fish & Richardson P.C.

(57) ABSTRACT

This document generally describes systems, methods, devices, and other techniques for using distributed ledgers, such as a blockchain database, to facilitate secure distribution and use of 3D model files to 3D printers over a computing network. A 3D printer controller may access an electronic ledger that identifies a plurality of 3D model files that have been made available for distribution. A particular 3D model file and a secret key may be obtained by the printer, where the 3D model file is encrypted based on the secret key. The secret key can be decrypted using a private key associated with the computing device that corresponds to the public key. After decrypting the secret key, the particular 3D model file can be decrypted using the secret key, and after decrypting the particular 3D model file, the particular 3D model file can be executed on the printer to print a physical 3D object.

17 Claims, 6 Drawing Sheets

(51) Int. Cl.
*H04L 9/08* (2006.01)
*B33Y 50/00* (2015.01)
*B29C 64/386* (2017.01)
*G06Q 20/40* (2012.01)

(56) References Cited

U.S. PATENT DOCUMENTS

| | | | |
|---|---|---|---|
| 2015/0253761 A1* | 9/2015 | Nelson | G06F 17/50 700/98 |
| 2016/0026418 A1* | 1/2016 | Bastaldo-Tsampalis | G06F 3/1206 358/1.15 |
| 2016/0103984 A1* | 4/2016 | Warrier | G06F 21/32 713/186 |
| 2016/0180061 A1* | 6/2016 | Pogorelik | G06F 21/10 713/189 |
| 2017/0028622 A1* | 2/2017 | Westlind | G03F 7/0037 |
| 2017/0200137 A1 | 7/2017 | Vilmont | |

OTHER PUBLICATIONS

Jeff Herbert et al., "A Novel Method for Decentralised Peer-to-Peer Software License Validation Using Cryptocurrency Blockchain Technology," ACSC, dated Jan. 27, 2015, [Retrieved on Mar. 24, 2017], Retrieved from the Internet: URL<http://crpit.com/confpapers/CRPITV159Herbert.pdf>. 9 pages.

'3D Printing,' [online][Retrieved on Mar. 28, 2016]; Retrieved from the Internet URL: http://explainingthefuture.com/3dprinting.html, 6 pages.

'A Next-Generation Smart Contract and Decentralized Application Platform,' [online][Retrieved on Mar. 28, 2016]; Retrieved from the Internet URL: https://github.com/ethereum/wiki/wiki/White-Paper, 24 pages.

'Contracts and Transactions,' [online][Retrieved on Mar. 28, 2016]; Retrieved from the Internet URL: https://github.com/ethereum/go-ethereum/wiki/Contracts-and-Transactions, 14 pages.

'Description of Symmetric and Asymmetric Encryption,' [online][Retrieved on Mar. 28, 2016]; Retrieved from the Internet URL: https://support.microsoft.com/en-us/kb/246071, 3 pages.

'Managing accounts,' [online][Retrieved on Mar. 28, 2016]; Retrieved from the Internet URL: https://github.com/ethereum/go-ethereum/wiki/Managing-your-accounts, 6 pages.

'Public-key cryptography,' [online][Retrieved on Mar. 28, 2016]; Retrieved from the Internet URL: https://en.wikipedia.org/wiki/Public-key_cryptography, 16 pages.

'What is 3D printing,' [online][Retrieved on Mar. 28, 2016]; Retrieved from the Internet URL: http://3dprinting.com/what-is-3d-printing/, 13 pages.

'The Greeter,' [online][Retrieved on Mar. 28, 2010]; Retrieved from the Internet URL: https;//www.ethereum.org/greeter, 13 pages.

Swan, Melanie, 'Blockchain,' O'Reilly Media, Inc., 2015, 149 pages.

Australian Office Actin for Application No. 2017201867, dated Mar. 13, 2018, 2 pages.

* cited by examiner

SECURE 3D MODEL SHARING USING DISTRIBUTED LEDGER

TECHNICAL FIELD

This document generally relates to file distribution among computers in a decentralized network, including techniques for improving the security of files distributed to 3D printers.

BACKGROUND

Three-dimensional printers are capable of forming 3D objects based on digital representations of 3D models. For example, a user may design an object using computer-aided design software. A representation of the object may be stored in a 3D model file, which can be interpreted and executed by a 3D printer to make the object, such as by successively depositing material in layers according to geometries indicated by the 3D model file. Content creators who design 3D objects may desire to share their designs with others.

SUMMARY

This document generally describes systems, methods, devices, and other techniques for using distributed ledgers, such as a blockchain database, to facilitate secure distribution of electronic files on a computing network. In some implementations, these techniques may substantially prevent files shared by a content provider from being read or used by unauthorized parties. Moreover, a content provider may distribute files with technical restrictions that limit how long the file may be used or how many times the file may be executed.

In some implementations, content creators and other providers of 3D models may advantageously use these techniques to share their designs with consumers while substantially reducing risks of file overuse or unauthorized sharing of the file. For example, a 3D model creator may require a consumer, with whom a 3D model file has been shared, to pay the creator for each copy of an object printed using the file. The distribution techniques described herein may allow content providers to more freely share their designs on a computing network, while providing practical regulation of the use of shared designs.

Some implementations of the subject matter described herein include a computer-implemented method. The method can include accessing an electronic ledger that identifies a plurality of 3D model files that have been made available for distribution. Respective instances of the electronic ledger can be separately maintained by each of a plurality of nodes in a computing network. A computing device may obtain, using information contained in the electronic ledger, a particular 3D model file among the plurality of 3D model files identified in the electronic ledger. The particular 3D model file obtained by the computing device can be encrypted based on a secret key. The secret key can be obtained by the computing device, wherein the secret key is encrypted based on a public key associated with the computing device. The secret key can be decrypted using a private key associated with the computing device that corresponds to the public key. After decrypting the secret key, the particular 3D model file can be decrypted using the secret key, and after decrypting the particular 3D model file, the particular 3D model file can be executed on the computing device to print a physical 3D object.

These and other implementations can optionally include one or more of the following features.

The computing device can include a 3D printer.

The electronic ledger store data that identifies 3D model files submitted for distribution by a plurality of 3D model providers.

The computing device can be one of the plurality of nodes in the computing network that maintains a respective instance of the electronic ledger, and a first instance of the electronic ledger can be stored at the computing device.

The computing device can receive requests from other computing devices to update the electronic ledger. In response to receiving the requests, the computing device may validate the requests from the other computing devices to update the electronic ledger. In response to validating the requests from the other computing devices to update the electronic ledger, the first instance of the electronic ledger that is stored at the computing device can be updated based on information included in the requests. Validating the requests from the other computing devices can include identifying at least a threshold degree of consensus among the plurality of nodes in the computing network that the electronic ledger should be updated.

The electronic ledger can include, for each of a plurality of 3D model files, a ledger entry that (i) identifies a given 3D model provider that submitted the respective 3D model file for distribution and (ii) indicates a path to a location where the respective 3D model file is stored.

At least some of the plurality of 3D model files identified in the electronic ledger can be stored in a distributed file system. The paths indicated by the respective ledger entries for the at least some of the plurality of 3D model files can identify the at least some of the plurality of 3D model files on the distributed file system.

Obtaining the secret key can include posting to the electronic ledger a request for the secret key or for the particular 3D model file, including transmitting the request to at least a subset of the plurality of nodes in the computing network that maintain respective instances of the electronic ledger.

An indication can be recorded on the ledger of a payment from a user of the computing device to a provider of the particular 3D model file, wherein the computing device obtains the secret key in response to verifying the payment.

After executing the particular 3D model file, a subsequent attempt by the computing device to execute the particular 3D model file can be identified. The subsequent attempt to execute the particular 3D model file can be blocked based on at least one of (i) a temporal restriction associated with the particular 3D model file or (ii) a maximum use restriction associated with the particular 3D model file.

An alert can be provided from the computing device to one or more computers associated with a provider of the particular file based on identifying that at least one of the following conditions has occurred: (i) the computing device has completed executing the particular 3D model file, (ii) the computing device has obtained the secret key for decrypting the particular 3D model file, (iii) the computing device has decrypted the secret key, or (iii) the computing device has decrypted the particular 3D model file.

The one or more computers associated with the provider of the particular 3D model file can be configured to re-encrypt the particular 3D model file with a second secret key in response to receiving the alert from the computing device, wherein the second secret key is different than the secret key.

The secret key can be generated by one or more computers associated with a provider of the particular 3D model file that submitted the particular 3D model file for distribution on the distributed ledger.

The distributed ledger can be a distributed database implemented as a blockchain.

Some implementations of the subject matter described herein can include a three-dimension (3D) printer. The 3D printer can include a printer assembly, a network interface, an electronic ledger, a key manager, and a controller. The printer assembly can include means for depositing layered material to form a 3D model. The network interface can be configured to communicate with a plurality of computing nodes in a peer-to-peer network. The electronic ledger can be stored on the 3D printer and can identify a plurality of 3D model files that have been made available for distribution. The electronic ledger may be replicated on at least a subset of the plurality of computing nodes. The key manager can be configured to store cryptographic keys. The controller can be configured to select a 3D model file identified in the electronic ledger, cause the network interface to obtain the selected 3D model file based on information indicated by the electronic ledger, decrypt the selected 3D model file using one or more cryptographic keys stored in the key manager, and cause the printer assembly to form the 3D model based on the decrypted 3D model file.

These and other implementations can optionally include one or more of the following features.

The 3D printer can include a tamper-resistant security module that includes hardware configured to interfere with attempts to modify or intercept cryptographic keys stored by the key manager.

The electronic ledger be a blockchain-based distributed database.

The controller can be configured to decrypt the selected 3D model by decrypting a secret key that was used to encrypt the 3D model and to use the decrypted secret key to decrypt the selected 3D model.

Some implementations of the subject matter described herein can include one or more non-transitory computer-readable media having instructions stored thereon that, when executed by one or more processors, cause performance of operations. The operations can include accessing an electronic ledger that identifies a plurality of 3D model files that have been made available for distribution, wherein respective instances of the electronic ledger are separately maintained by each of a plurality of nodes in a computing network; obtaining, by a computing device using information contained in the electronic ledger, a particular 3D model file among the plurality of 3D model files identified in the electronic ledger, wherein the particular 3D model file obtained by the computing device is encrypted based on a secret key; obtaining the secret key at the computing device, wherein the secret key is encrypted based on a public key associated with the computing device; decrypting the secret key using a private key associated with the computing device that corresponds to the public key; after decrypting the secret key, decrypting the particular 3D model file using the secret key; and after decrypting the particular file, executing the particular 3D model file on the computing device.

DESCRIPTION OF DRAWINGS

Like references and indicators among the drawings indicate like elements.

DETAILED DESCRIPTION

Figure 1:
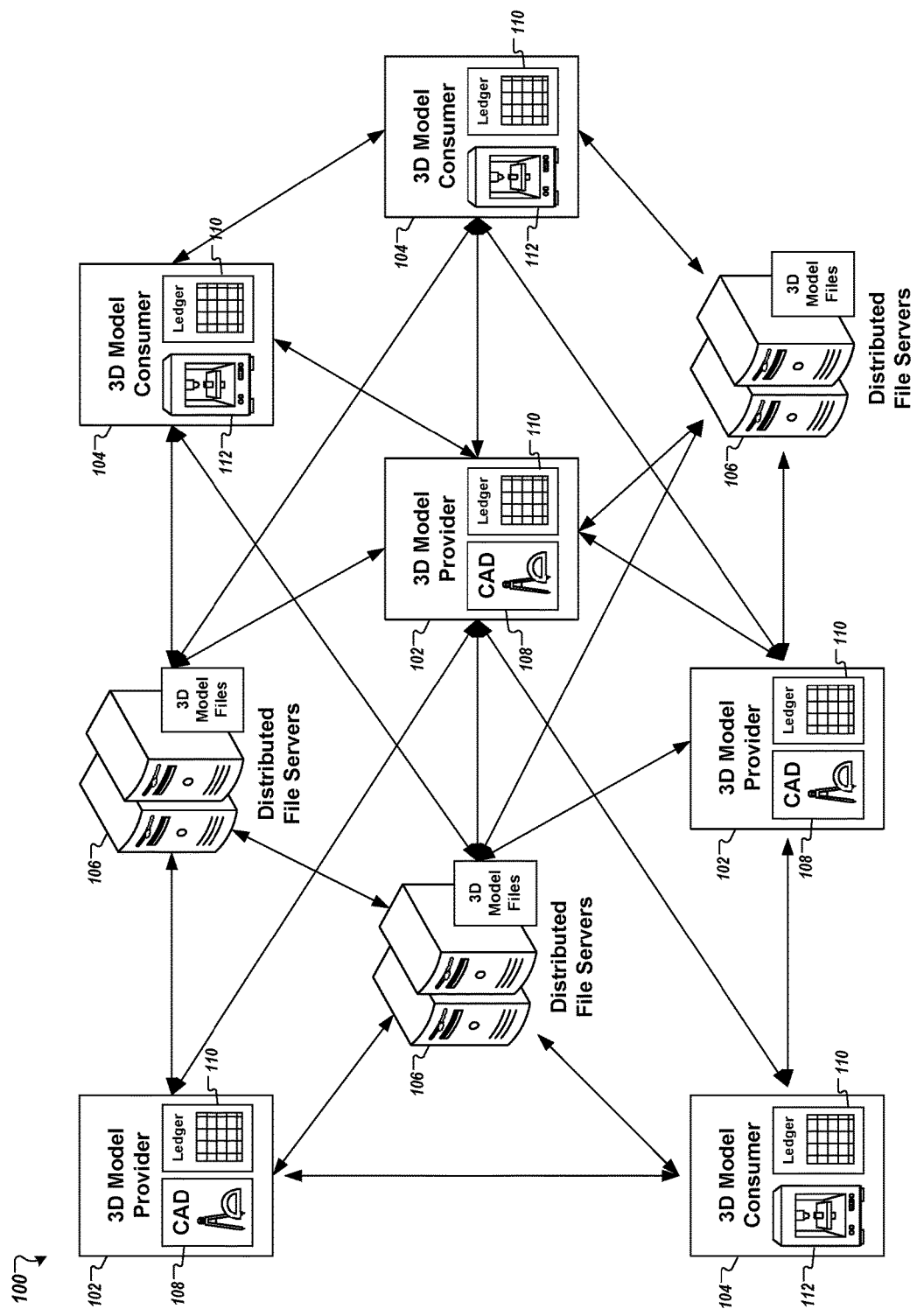
FIG. 1 shows a conceptual diagram of a computing system for securely sharing digital files based on a decentralized network of computing nodes maintaining a distributed ledger.

This document generally describes systems, methods, devices, and other techniques for using distributed ledgers (e.g., a distributed blockchain database) to facilitate secure distribution of digital files on a computing network. For example, a content provider may post a record to a distributed ledger that identifies a file the provider has made available for distribution. The record may include metadata describing the contents of the file and a set of conditions required for others to be granted permission to execute the file. The record is generally transparent to each of a plurality of nodes in a computing network that maintains the distributed ledger. As such, when a user at one of the nodes (i.e., a "consumer") requests permission to use a file that has been posted to the ledger, events associated with the request can be recorded in the ledger and validated by all or some of the other nodes in the network. Moreover, each file posted to the ledger can be associated with code for a computer program (e.g., a "smart contract") that is executed responsive to a user's selection of the file. The program can be stored on the ledger and, when executed, can cause one or more aspects of a secure file sharing transaction to be automatically carried out, including providing an encrypted file to a consumer, providing a key to the consumer for decrypting the file, initiating payment from the consumer for a right to use the file, providing a token to the consumer to limit use of the file, or a combination of these.

In some implementations, the techniques described herein can be applied to facilitate reliable, secure distribution of models to a 3D printer. The distributed ledger framework can be particularly beneficial to distribute 3D model files because of the ability to connect a community of independent content providers and content consumers while ensuring file security and digital rights management. One challenge faced by 3D model creators who wish to share their models with others is that, without restriction, consumers could potentially print an unlimited number of objects with the file. The consumers may in turn sell or otherwise give away copies of the objects to a degree that could devalue the model without the content provider (e.g., model creator) receiving commensurate compensation for the unlimited replication of the model. Moreover, model creators face the risk of consumers who have purchased files from the creators from sharing those files with other consumers without the creators' authorization.

The techniques described herein can, in some implementations, at least partially overcome these challenges faced by content creators and other providers of 3D model files. For example, a content provider may encrypt a 3D model file to be shared with a consumer using a secret key, and both the encrypted file and the key can be provided to the consumer.

The secret key itself may be encrypted based on a public key associated with the consumer's 3D printer, so that only the printer of an authorized consumer is able to use the secret key to access the 3D model file. A nonce, a token, or other data provided to the consumer may also restrict a number of times or a length of time that the 3D printer can use the 3D model file. In this way, the content provider can distribute the 3D model file with security that prevents the file from being used by non-authorized users, and prevents the number of copies that can be made of an object using the distributed file. Moreover, the distributed network framework can enable trusted transactions among content providers and consumers without a need to rely on a central authority or requiring that the parties trust each other to honestly perform a file sharing agreement.

Turning to FIG. 1, a conceptual diagram is shown of a computing system 100 for securely sharing digital files using a distributed ledger. The computing system 100 comprises a network of interconnected computing nodes that are variously associated with one or more content providers 102, one or more consumers 104, and one or more file servers 106. In some implementations, the computing nodes are arranged as a distributed or peer-to-peer network, rather than as a centralized "spoke-and-hub" network. The content providers 102 in the network generally refer to network participants that make content (e.g., 3D model files) available for distribution over the network. The consumers 104 generally refer to network participants that request and receive distributed files over the network. The file servers 106 generally refer to computing systems that store files which have been made available for distribution in the network. In some implementations, the file servers 106 may be arranged as a distributed file system. In some implementations, the content providers 102, consumers 104, and file servers 106 may be separate participants in the network (i.e., a given network participant may only be classified as one of a provider, a consumer, or a file server). In other implementations, however, a given network participant may have multiple roles. For example, a user that has created a 3D model for sharing over the network may also be interested in printing 3D models that other network participants have created and made available on the network. That same user may thus act as both a content provider 102 and as a consumer 104. In some implementations, files may hosted by content providers 102, consumers 104, or both such that the content provider 104 or consumer 102 also acts as a file server 106.

By way of example, each of the content providers 102 in the network is associated with a computer that includes tools (represented by computer-aided design (CAD) software 108) for creating 3D model files that are to be distributed over the network. Likewise, each of the consumers 104 in the network is associated with a computer for executing a distributed file, such as a 3D printer 112 for making objects based on a distributed 3D object file. Further description of example 3D printers 112 that may be used in the system 100 are described further below with respect to FIGS. 2 and 5.

In some implementations, each node in the network of system 100, or each of a proper subset of the nodes in the network, may store and maintain a copy of an electronic ledger 110. The ledger 110 may generally include a chronological sequence of entries of all transactions related to files that have been made available for distribution over the network. Transactions that are recorded in the ledger 110 may include, for example, notices submitted by content providers 102 that a file has been made available for distribution, selections by consumers 104 to purchase the right to use files distributed over the network, records of file transfers, file uses, and payments made between content providers 102 and consumers 104, or a combination of these. The ledger 110 is sometimes referred to as a "distributed ledger" because the ledger 110 is not maintained by a single, central entity that must be trusted by all parties to a transaction; rather, respective copies of the ledger 110 may be maintained at each a plurality of nodes in the network in a decentralized architecture. When a transaction occurs at any node in the network, an indication of the transaction can be propagated to each of the other nodes in the network that maintains a copy of the distributed ledger 110. Each of the nodes may then perform a validation routine with respect to the transaction. If at least a threshold number of nodes reach a consensus that the transaction is valid, then the transaction can be permanently recorded in the distributed ledger 110.

Each node in the network may update its respective copy of the ledger 110 separately, but in effect the ledger 110 is identically replicated across the network because the ledger 110 is only updated when a consensus is reached by a threshold portion of the nodes in the network. If at least a threshold level of consensus is not reached, then the transaction may be denied and the ledger is not updated to reflect a change in status among the network participants based on the transaction (e.g., no file transfer recorded or payment of funds made, although a record may be maintained that a transaction was attempted and failed). Any of the nodes in the network may maintain a copy of the ledger 110. In the example of FIG. 1, each of the content providers 102 and consumers 104 maintain a copy of the ledger 110. In some implementations, the file servers 104 and/or other computers that don't specifically serve as a content provider 102, consumer 104, or file server 106 may also store and maintain instances of the ledger 110.

In some examples, the distributed ledger 110 may be implemented as a distributed blockchain database. A blockchain database is generally a database that is shared among a plurality of nodes constituting a network, wherein each node can directly access (i.e., read and write) the database. A blockchain database is a distributed system in which there may be no central administrator, and each node's copy of the ledger 110 is identical to every other node's copy. A blockchain database can be reliable and transparent, in that transactions (e.g., events related to the distribution and use of 3D model files over the network) may be permanently recorded and may not be capable of revision. Thus, data that is stored in the database may not be altered or deleted without leaving a trace. When a node "sends a transaction" to a blockchain database, it may access the database in accordance with an action specified in the transaction, e.g. it may read and/or write data and/or run a program stored in the blockchain.

Transactions recorded in a blockchain database can be grouped into "blocks," which are, after validation via a consensus algorithm, chained together over time to form a "blockchain." The blocks is said to form a "chain" because each block may contain a reference to the previous block. For example, each block may include a timestamp that identifies when a previous block has been added to the chain. In some implementations, every block in the chain may contain a hash of the previous block in the chain. This has the effect of creating a chain of blocks from the genesis block to the current block. Each block is guaranteed to come after the previous block chronologically because the previous block's hash would otherwise not be known. Each block is also computationally impractical to modify once it has been in the chain for a while because every block after it would also have to be regenerated. Honest generators may only build onto a block (by referencing it in blocks they create) if it is the latest block in a longest valid chain. "Length" may be calculated as total combined difficulty of that chain, not number of blocks, though this distinction is only important in the context of a few potential attacks. A chain may be deemed valid if all of the blocks and transactions within it are valid, and only if it starts with the genesis block.

In some implementations, nodes in the computing network that maintain the distributed ledger 110 can validate a block of transactions that is to be added to the blockchain by reaching at least a threshold consensus among the nodes that (i) a digital signature associated with the block is valid and (ii) the block (or transactions within the block) comply with one or more additional validation rules. Each computing node in the network (or a subset of the nodes that are tasked with maintaining the distributed ledger 110) can independently validate a block of transactions. If at least a threshold number of these nodes (e.g., 50, 60, 75, or 100 percent of the nodes) validate the block, then the block can be added to the blockchain. If the threshold consensus is not reached, the block may not be added to the blockchain. This can ensure that no individual node acts dishonestly to alter the ledger 110 in an unauthorized way.

In some implementations, each node in the network may be associated with an identifier and be provided with a cryptographic private key-public key pair. All the nodes in the network may have a list of the public keys and the respective identifiers of the other nodes. When a node sends a transaction (e.g., any record to be recorded) to the blockchain database, the node can sign the transaction with its private key. The transaction may then be broadcast to the other nodes, wherein each communication from a node uses the node's identifier. The other nodes can then use the public key associated with the identifier to verify the digital signature so as to authenticate the source of the communication and confirm that the communication has not been tampered with. The other nodes may also check that the transaction complies with any additional rules required to validate a transaction or block of transactions. Once the validity of a block has been ascertained, the other nodes may indicate its validity by signing the block themselves with their private keys, so that the block can be deployed to the blockchain. The consensus process may be carried out by all nodes or only by a pre-selected set of nodes. This means that it may be necessary for all the nodes to sign the block, or only for a part of them, in order to validate a block. According to an example, a 3D printer or other device associated with consumers 104 may include a cryptographic key manager that is configured to generate the node's private key and the corresponding public key.

In some implementations, the distributed ledger 110 may employ a permissioned blockchain. A permissioned blockchain database is a blockchain database in which transaction processing is performed by nodes associated with known identities. In other words, the identity of the users of the nodes is whitelisted (or blacklisted), e.g. through some type of know-your-business (KYB) or know-your-client (KYC) procedure. Similarly, the blockchain database may be private, meaning that access to the blockchain database data may be limited, e.g. only to certain content providers 102 and consumers 104.

In some implementations, the ledger 110 (e.g., blockchain database) may not only store transactional records, but also files comprising a combination of data and executable computer programs. To this end, the blockchain database may be provided, for example, with a Turing-complete programming language. In some implementations, a permissioned blockchain can enable the stipulation of trusted agreements between different nodes in the network, since at least pseudonyms of the users are known. The conditions of these agreements may be stored in the blockchain database and, since they reside in the blockchain database, the conditions are transparent, i.e. they cannot be covertly modified by one of the parties. In some implementations, programs that, when executed, automatically cause performance of one or more aspects of a file sharing transaction to be performed pursuant to an agreement can be stored in the blockchain. These programs are sometimes referred to as "smart contracts."

In some implementations, programs stored on the blockchain may include a set of functions reachable through the address at which the program file resides in the blockchain. By accessing the program via its address, one or more functions may be executed. The program is stored in the blockchain database but is executed locally by the nodes. The functions may require input to run; when a node sends the transaction that calls a function, it may also provide the necessary input data. In some implementations, the blockchain database may be not only permissioned, but also include rights management for the functions in the programs, in that only a subset of the nodes (whitelisted nodes) may be allowed to call specific functions.

As an example, a set of information about a 3D model file that a content provider 102 has made available for distribution in the network can be stored in the distributed ledger 110. The set of information may include program code that defines a "smart contract" for the 3D model file. The smart contract may be configured to implement the terms of an offer made by the content provider 102. For example, responsive to a consumer's 104 selection to purchase a right to use the 3D model file, the smart contract may initiate payment from the consumer 104 to the content provider 102 of an amount specified in the smart contract, and may also initiate the provisioning to the consumer 104 of an encrypted 3D model file, a key for decrypting the 3D model file, or both. In some implementations, the smart contract program can identify a storage location of the 3D model file, which has been encrypted by the content provide 102 using a secret key based on a symmetric encryption algorithm. The consumer 104 (specifically, a computer associated with the consumer 104 such as a 3D printer) can download the encrypted 3D model file, and then be provided the secret key as a result of the smart contract execution.

In some implementations, the secret key provided to the consumer 104 may itself be encrypted based on an asymmetric encryption algorithm using the consumer's 104 public key. The consumer 104 can then recover the secret key using the consumer's 104 private key, and can then decrypt the 3D model file using the decrypted secret key. In some implementations, for increased security, the decrypted 3D model file may be stored on a secure location of a computer associated with the consumer 104 (e.g., secure storage of a 3D printer). The secure storage may prevent users from manually reading, copying, or accessing the decrypted 3D model file other than to print objects with the file in compliance with any restrictions specified agreed to by the content provider 102 and consumer 104 (e.g., temporal restrictions or maximum use restrictions that limit the number of objects that can be printed using the file).

In some implementations, the content provider 102 and consumer 104 may each post transactions to the distributed ledger 110 that indicate the status and events related to performance of a file sharing agreement among the parties. For example, transactions may be recorded in the ledger 110 that indicate occurrences of a content provider 102 adding, removing, or modifying a 3D model file for distribution; occurrences of a consumer 104 making an agreement with the consumer 102 to pay the consumer 102 for the right to at least a limited use of the 3D model file; occurrences of payment being made to the content provider 102; occurrences of a 3D model file and associated decryption keys being provided to the consumer 102; occurrences of the consumer 104 using the file; and occurrences of the consumer's 104 allowed use of the file being completed. In some implementations, payments may be made through the distributed ledger 110 or another blockchain database using a cryptocurrency such as bitcoin. In some implementations, payments may be made outside of the distributed ledger 110 frame, such as by a Single Euro Payments Area (SEPA) transfer, or other transfers conducted through public or private banking institutions. The banking institutions may expose an application programming interface (API) to consumers and content providers to enable financial transactions, for example.

Figure 2:
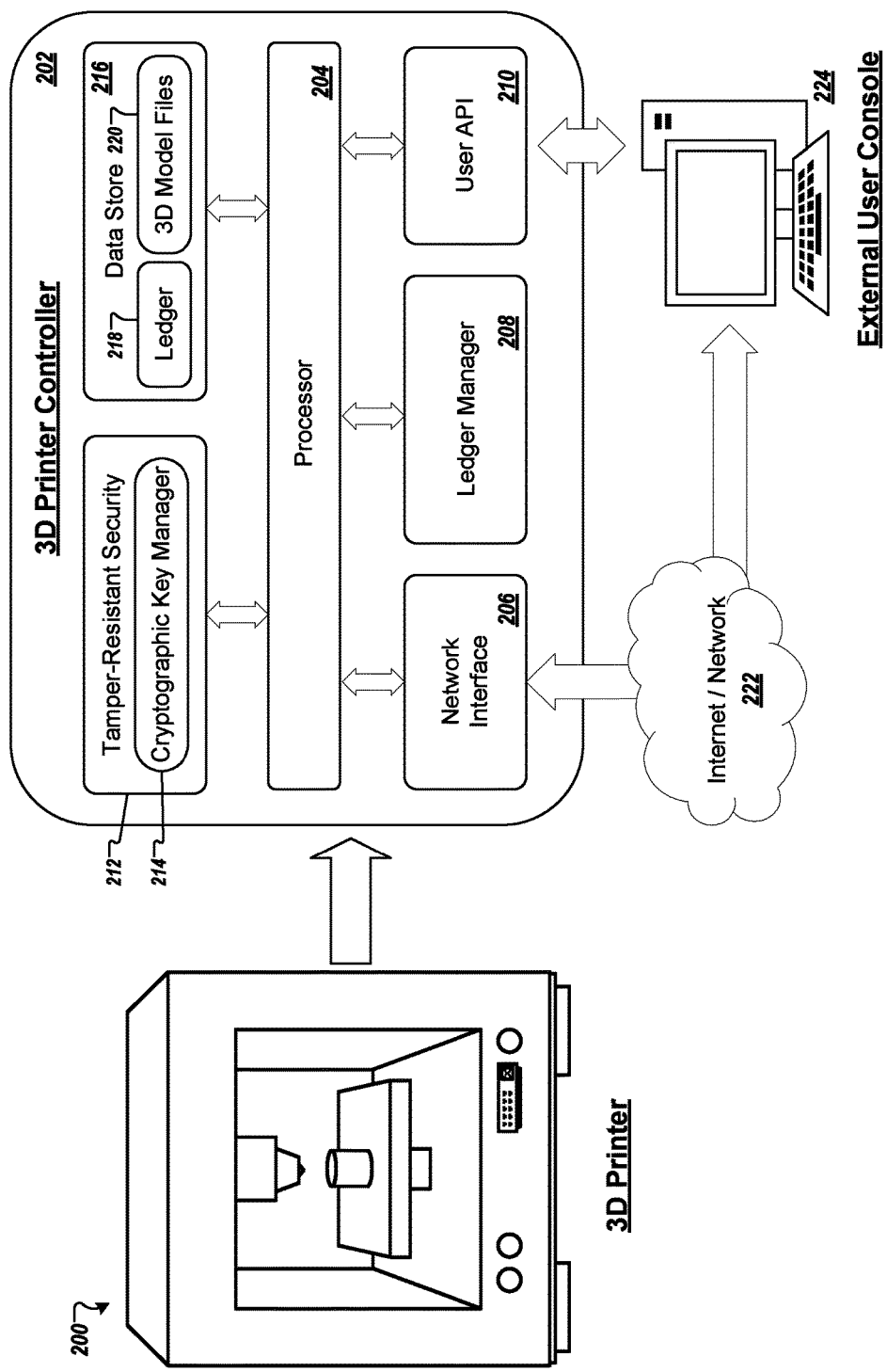
FIG. 2 depicts a block diagram of a controller of a 3D printing device which is configured to obtain files made available through a distributed ledger.

FIG. 2 depicts a block diagram of a controller 202 associated with a 3D printing device 200 that is configured to obtain files made available through a distributed ledger 218, such as a blockchain database. The 3D printer 200 is generally capable of creating 3D objects based on models defined by a 3D object file. In some examples, the 3D printer 200 can be configured in the manner of the printers 112 of FIG. 1 or the printer 502 of FIG. 5. Likewise, the printers 112 of FIG. 1 or the printer 502 of FIG. 5 can be implemented in the manner of printer 200 of FIG. 2. The controller 202 may include a combination of hardware and software that are collectively configured to perform the operations described herein. In some implementations, the controller 202 may be integrated into the 3D printer 200 (e.g., permanently fixed to a chassis of the printer 200). In some implementations, the controller 202 may be in communication with, but physically separate from, the 3D printer 200. For example, the controller 202 may be a desktop computer or other device that communicates with the printer 200 over a network or a wired or wireless connection. In some implementations, some portions of the controller 202 may be installed on the 3D printer 200, while other portions of the controller 202 are physically separate from the 3D printer.

The controller 202 includes a network interface 206 for communicating over a network 222 with other nodes in a computing network. In some implementations, an external user console 224 can be provided that provides a graphical user interface (via user API 210) to an operator of the 3D printer 200 for accessing settings associated with the 3D printer 200, browsing 3D model files that have been posted to the distributed ledger 218, initiating file acquisitions through the distributed ledger framework, and more.

The printer 202 includes one or more computer processors 204, a network interface 206, a ledger manager 208, a user application programming interface (API) 210, a tamper-resistant security module 212, and a data store 216. The tamper-resistant security module may further include a cryptographic key manager 214, and the data store 216 may be arranged to store a copy of a distributed ledger 218 and 3D model files 220 acquired by a consumer or created on the controller 202.

The processors 204 may, in some implementations, include a microcontroller having computer-readable media that stores instructions for operations that the processors 204 are programmed to perform. The processors 204 may interact with and pass messages between various components of the controller 202.

The data store 216 can store data associated with the 3D printer 200 including a copy of the distributed ledger 218 and one or more 3D model files 220. The ledger manager 208 is configured to maintain the ledger 218, affect updates to the ledger 218, generate transactions to broadcast to other network nodes, and determine the validity of transactions broadcasted from other network nodes. The network interface 206 may broadcast new transactions and receive updates (e.g., new blocks/transactions) related to the ledger 218. Communications transmitted via the network interface 206 to other network nodes may be associated with an identifier of the 3D printer 200, which uniquely identifies the printer 200 in the network of nodes that share a blockchain database for example.

Furthermore, the 3D printer 200 may also be provided with a cryptographic private key-public key pair. The key manager 214 may generate the keys, which are securely stored in the tamper-resistant security module 212. The private key can then be used by the printer 200, for example, to sign transactions sent to the ledger 218 and broadcasted to other nodes. The private key may also be used to decrypt communications transmitted from other network nodes to the printer 200 (e.g., to decrypt a secret key that was used by a content provider to encrypt a 3D model file). The tamper-resistant security module 212 may include safeguards that obstruct unauthorized accesses to the keys or other data maintained therein. Examples of anti-tamper provisions include epoxy potting, conductive shield layers that prevent reading of internal signals, custom designed chassis and enclosures to prevent probing attacks, and real-time monitoring of environmental conditions such as temperature and power.

Figure 3:
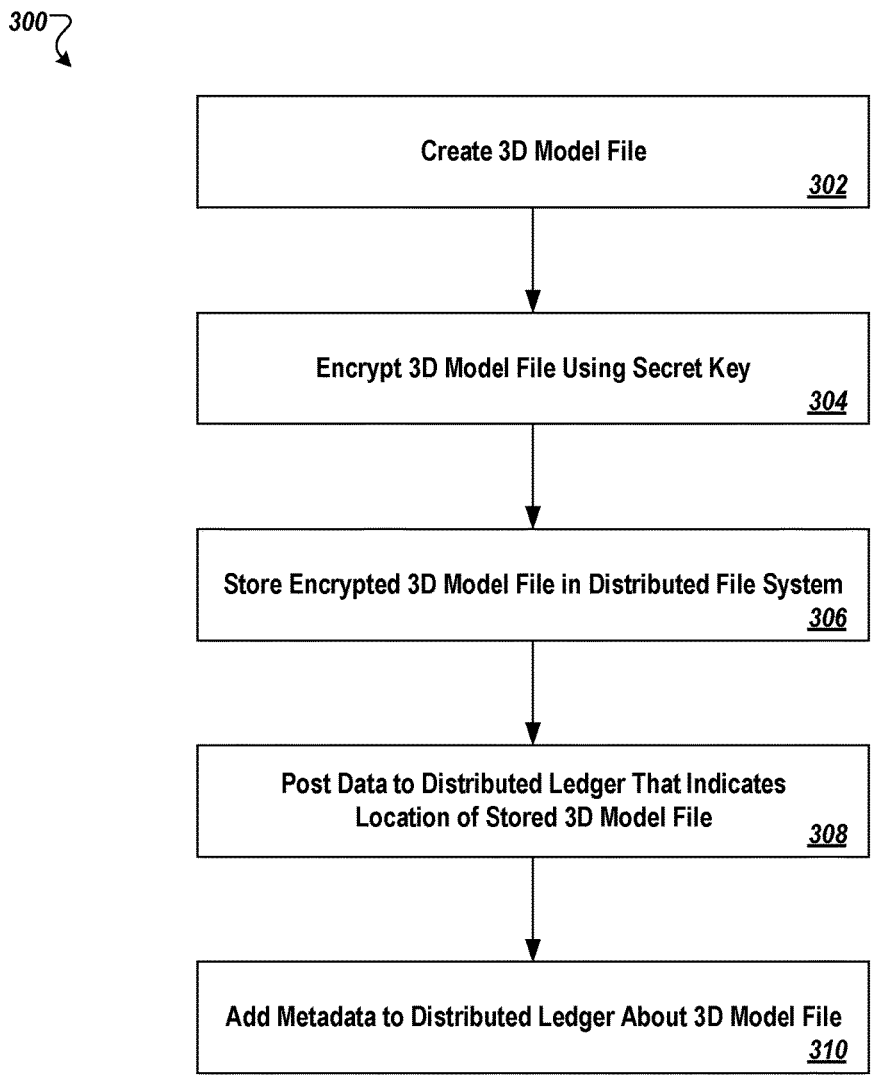
FIG. 3 is a flowchart of an example process for making an electronic file available for distribution in a decentralized network.

Referring to FIG. 3, a flowchart is shown of an example process 300 for making an electronic file available for distribution using a distributed ledger. The process 300 is discussed, by way of example, with respect to a 3D model file that can be used by a 3D printer to print a three-dimensional article. In some implementations, these techniques may be particularly beneficial in circumstances where a content provider desires to restrict access to a file that has been made available for distribution until one or more conditions are satisfied (e.g., until the provider is paid for access to the file), and to implement temporal and/or use-based restrictions on the file that prevent the purchaser (consumer) from re-using the file more than a predetermined number of times or beyond a predetermined time limit.

The process 300 begins at stage 302 when a content provider selects a particular 3D model file to make available for distribution. In some implementations, the content provider may also be the creator of the content. For example, a hobbyist that uses computer-aided design (CAD) software may create a model car that he or she wishes to share with others who have the ability to print objects using a 3D printer. To protect the hobbyist's creativity and efforts, the process 300 may be performed to distribute the model file while restricting access to only authorized consumers, such as consumers who make a financial payment to the hobbyist, or to consumers who are verified to be members of a group associated with the hobbyist (e.g., a social media group). The content provider may not necessarily be the creator of the 3D model file, however. For example, a distribution service may accept files submitted by content creators to make the files available to a network of consumers on behalf of the creators.

At stage 304, the 3D model file is processed to prepare it for distribution, which can include cryptographically encrypting the file. In some implementations, the file can be encrypted using a secret key based on a symmetric encryption algorithm in which the same secret key is also usable to subsequently decrypt the file. The key may be generated on a computer associated with the content provider or distribution service, for example. The key may be randomly generated by, or pre-stored on, a cryptographic security module of the computer. The cryptographic security module may be capable of storing multiple keys and/or periodically generating new keys, so as to allow the file to be re-encrypted from time to time. For example, as described in further detail with respect to FIG. 4, a computing system associated with a content provider (or associated with another entity tasked with making the file available for secure distribution) may re-encrypt a file after the expiration of a determined period of time and/or responsive to one or more triggering events associated with a consumer's use of the file. Re-encryption of the file with different keys from time to time can increase the security of the file, so that authorized parties who have been given the secret key cannot later share the key with others to allow unlimited use of the file.

In some implementations, the file may be encrypted based on an asymmetric encryption algorithm. For example, if a consumer sends payment to a content provider for the right to use a 3D model file associated with the provider, the content provider may access a public key associated with the consumer and encrypt the 3D model file using the public key. Upon receiving the encrypted 3D model file, the consumer can then use a corresponding private key in a public key-private key pair to decrypt the file and use it to print one or more objects defined in the 3D model file.

At stage 306, the encrypted 3D model file is stored in a location that is accessible to consumers and from which interested consumers can download the encrypted file. In some implementations, one or more servers (e.g., file servers 106) may host the encrypted file. Consumers can then obtain the file from the servers by sending to the servers HTTP requests, FTP requests, or requests compliant with other suitable protocols. The path or other location information for the file can be identified in a transaction recorded in the distributed ledger that identifies the file as being available for distribution.

In some implementations, the file may be stored in a distributed file system. In a distributed file system, file storage is not centralized at one or a few servers. Rather, the file may be replicated across many nodes in a computing network, and the file may be communicated to other nodes (e.g., consumers) via peer-to-peer (P2P) file sharing protocols. By employing a distributed/decentralized approach, the content provider can avoid the need to setup a dedicated server and need not count a single server operator to ensure the content is available. Moreover, by placing files in the distributed file system, discrepancies may be detected among instance of the files stored on different nodes if a file is tampered with or otherwise altered. In some implementations access to the stored file may be unrestricted, but because the file is encrypted, only authorized parties who are provided the requisite key to decrypt the file will be able to reveal its contents and use it for its intended purpose (e.g., printing 3D models). In some implementations, in addition to or alternatively to encrypting the file, the file system in which the file is stored may regulate access to the file. For example, the file system may verify that credentials submitted by a given user indicate that the user is authorized to obtain the file before the file is released to the user. In some implementations, file may be stored outside of the distributed ledger. For example, a computing network of nodes that separately maintain and store copes of the distributed ledger may also store the encrypted 3D model file, or the file may be stored on at least some different nodes from the nodes that maintain and store copies of the distributed ledger.

At stage 308, the computing system of the content provider or distribution service creates a record in the distributed ledger that identifies the 3D model file and indicates that the file is available for distribution. In some implementations, the record can be created on the distributed ledger by sending a transaction to the blockchain database. For example, the transaction (e.g., record of the 3D model file) may first be sent to a computing device for a first node in a computing network of nodes that each maintains the distributed ledger. In response to the first node receiving the request to post the transaction on the ledger, the first node can forward the request to all or a portion of the other nodes in the network to which the first node is connected. In turn, those nodes that received the request from the first node can forward the request to other nodes that they are connected to in the network. The request can be successively forwarded in this manner until all the nodes in the network have received the request.

In some implementations, each node in the network independently validates the request to ensure that the request complies with one or more rules. For example, the information that is requested to be posted to the ledger may identify the content provider that made the request, a path that indicates a location at which the encrypted file is stored, and a hash of the encrypted file. As part of the validation, the individual nodes may verify that the purported file is available at the location indicated in the request and may authenticate the content provider to verify that the content provider is authorized to post to the ledger. The individual nodes may share the results of the validation with each other, and if at least a threshold consensus among the nodes is reached (e.g., 75-percent of the nodes performing the validation), then the record for the 3D model file can be added by each of the nodes to the respective instances of the ledger stored at each of the nodes. In some implementations, only a subset, and not all, of the nodes may perform the validation procedure.

At stage 310, the content provider can optionally add or modify metadata about the 3D model file to the record of the file on the ledger. The metadata may include, for example, a textual description of the 3D model defined by the file (e.g., information indicating that the file prints the Eiffel Tower, a monument, or a tool). In some implementations, the metadata may include one or more images or other media that show examples of finished articles printed using the 3D model file, information about the content provider and/or content creator associated with the file, a popularity score associated with the file based on reviews and/or number of downloads of the file, information about use restrictions associated with the file (e.g., the file is only valid for two printings over a 24 hour period), a price for consumers to obtain the file, or a combination of two or more of these. Generally, the metadata may indicate information that a potential consumer would be interested in learning when making a decision about whether to purchase the file or a limited right to use the file. Of course, different types of metadata may apply in the context of different types of files that may be distributed. For example, metadata associated with distributed video files may differ from metadata associated with distributed 3D model files. In some implementations, the data may not be added or modified on the distributed ledger unless the submitter of the data is authenticated. For example, to add or modify metadata to a record for a 3D model file, a content provider may provide credentials that are required to be validated by at least a threshold number of nodes in the network before a change to the ledger is accepted and implemented in the ledger. In some implementations, modifications and updates to the ledger may occur in the form of adding new transactions to the ledger that indicate a modification or update, rather than modifying or updating an originally recorded transaction.

By the completion of stage 310 in process 300, the 3D model file has been made available for distribution and a record of the file is posted on the distributed ledger. The distributed ledger may be searchable through interfaces presented on consumer devices, for example, to allow a consumer to browse the ledger and select files that he or she may be interested in obtaining. In some implementations, the ledger may be public such that any content provider or consumer can access the ledger. Generally, anybody may register to become a participant in the computing network that maintains the ledger. For example, a consumer who purchases a new 3D printer may register the printer with the network, and a copy of the ledger can be provided to and stored on the printer. The 3D printer may be assigned a unique identifier or address in the network. As such, the 3D printer may receive transmissions from other printers in the network (e.g., requests to create records about new 3D model files available; records of transactions among consumers and content providers; requests to create new records that indicate modifications to previous records and more). The 3D printer may perform a validation procedure with respect to such requests, and if a consensus is reached among at least a threshold number of nodes in the network, then updates to the ledger can be implemented. Likewise, any content creator who desires to share his or her work with others through the distributed system can register as a node in the network in order to make new files available through the network by posting to the distributed ledger. The ledger can thus facilitate the distribution of files between many content providers and many consumers.

Figure 4:
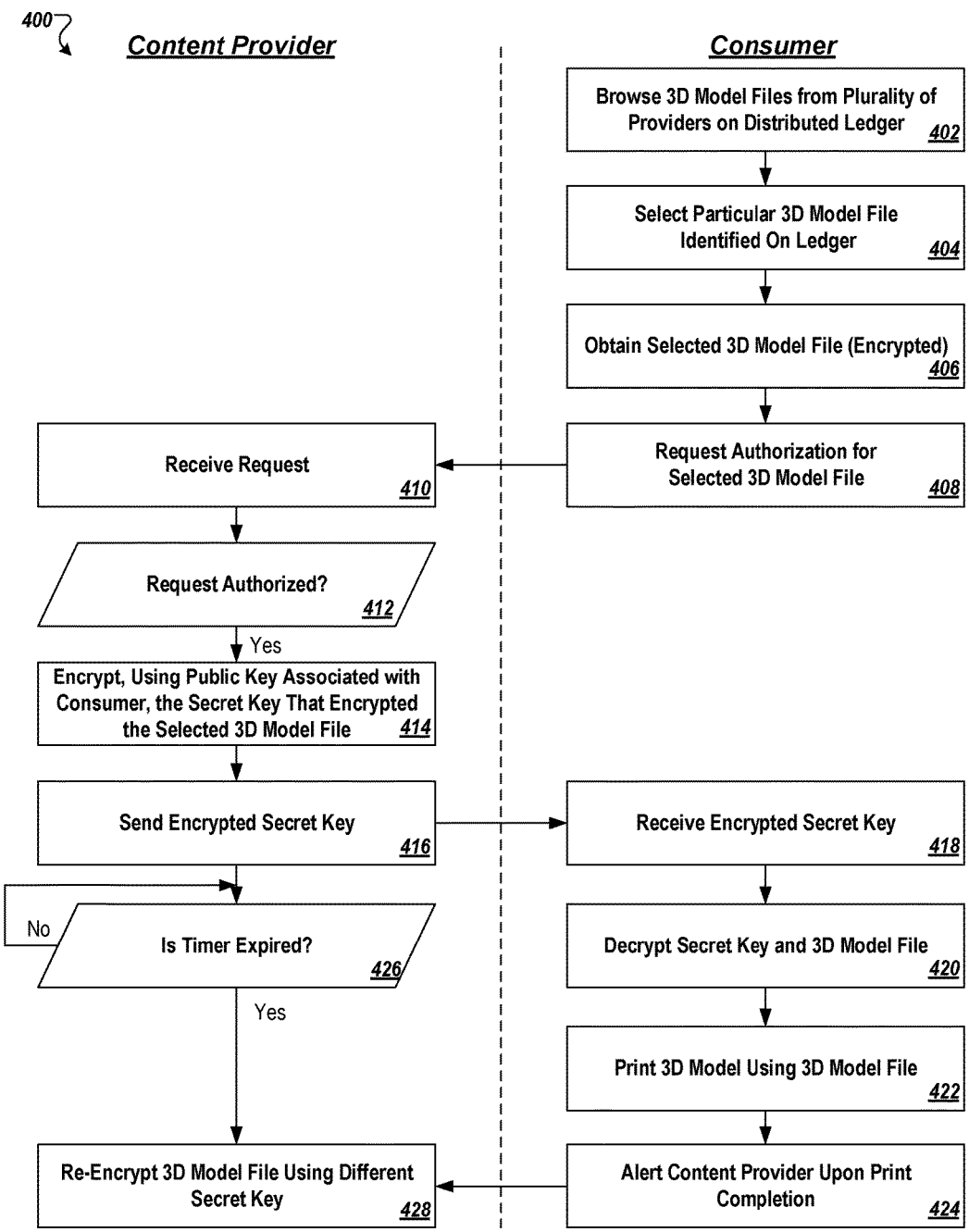
FIG. 4 is a flowchart of an example process for sharing a 3D model file with a consumer.

Turning to FIG. 4, a flowchart is shown of an example process 400 by which a consumer may use the distributed ledger to securely obtain and execute a file that has been made available for distribution by a content provider. The flowchart 400 generally depicts interactions between a content provider and a consumer that allow the parties to securely share a file according to a set of terms that are transparent to the parties before a transaction is consummated. In some implementations, the ledger and distributed network architecture can ensure that the content provider is or will be paid by the consumer for the right to use a file distributed by the content provider, and that the consumer's use of the file adheres to any restrictions imposed by the content provider (e.g., temporal use restrictions or maximum number of use restrictions). From the consumer's perspective, this architecture can ensure, for example, that the necessary keys to use an encrypted file are released to the consumer. From the content provider's perspective, the architecture can ensure that the consumer complies with a set of conditions specified by the content provider, such as making a valid payment or adhering to maximum use restrictions. In some implementations, the actions taken by the consumer in FIG. 4 may be performed by a controller of the consumer's 3D printing device.

At stage 402, a consumer accesses the distributed ledger to identify a target 3D model file to retrieve. In some implementations, records in the distributed ledger may be presented in a user interface on a consumer's device (e.g., personal computer, mobile device, or 3D printer). The user interface may present records in a manner that allows the consumer to easily browse and search for files that the ledger indicates have been made available for distribution.

At stage 404, the consumer selects to retrieve a particular 3D model file that the distributed ledger indicates is available for distribution. In some implementations, the consumer may review metadata associated with the 3D model file before making the selection such as sample images of the model, a price for use of the file, a description of the 3D model, and information about usage restrictions imposed by the content provider. Upon selection of a 3D model file, the consumer's computing device (e.g., the 3D printer) can automatically take action to obtain the file and prepare the file for use at the consumer's device as described in stages 406-420.

At stage 406, the consumer's device obtains the selected 3D model file. In some implementations, the device can use a hyperlink associated with the selected file and stored in the distributed ledger to download the 3D model file from a network location indicated by the hyperlink. For example, the hyperlink may indicate a path to a file storage location on a server or on a distributed file system. The consumer's device can transmit a request for the file, thereby prompting the computing system that hosts the file to provide the file to the consumer. The file received by the consumer's device may be encrypted. For example, a secret key associated with the content provider may have been used to encrypt the file so as to prevent unauthorized entities from accessing and using the file. In order to obtain authorization, the consumer's device at stage 408 initiates a request for authorization to use the selected 3D model file. In some implementations, the request can be made through the distributed ledger, such as by posting a record of the request to the record, which is then propagated to the content provider through the validation and consensus process that has been described. In some implementations, the request can be made outside of the distributed ledger such as by sending the request directly to the content provider using an appropriate network communications protocol (e.g., HTTP, FTP).

At stage 410, the request is received by one or more computers that are capable of authorizing the user's request for permission to use the 3D model file. In some implementations, if the request is transmitted outside of the distributed ledger framework, the request may be received and processed by a computer associated specifically with the content provider. For example, the content provider's computer may receive the request, and in response, authenticate the consumer using credentials that were transmitted as part of the request, verify payment, and confirm that the consumer has agreed to abide by any restrictions the content provider has imposed on use of the 3D model file. If all the conditions are satisfied (stage 412), the request can be authorized and the process 300 proceeds to stage 414. If any of the conditions is not satisfied, the content provider may deny the request and refuse to provide the consumer with the necessary key required to decrypt the 3D model file.

In some implementations, the consumer's request may be transmitted though the distributed ledger framework, for example, by invoking a smart contract (e.g., code defined in or referenced in the distributed ledger for carrying out a transaction to share a 3D model file) at one or more nodes of the computing network that administers the distributed ledger. The content provider's request can then be authorized or denied by execution of the smart contract, which may verify that one or more conditions are satisfied with respect to the request before completing the transaction. For example, the smart contract may include code that, when executed, causes the computing system to automatically authenticate the consumer using credentials that were submitted in the request, verify payment from the consumer to the content provider, and confirm that the consumer has agreed to abide by any restrictions that the content provider has imposed on use of the 3D model file.

At stage 414, if the consumer's request to use the 3D model file is authorized, one or more computers associated with the content provider or the network that administers the distributed ledger can identify a key that the consumer can use to unlock the 3D model file. In some implementations (e.g., symmetric encryption), the key can be the same key that was used to encrypt the 3D model file. That key can be provided to the consumer to allow a device associated with the consumer (e.g., a 3D printer) to decrypt and use the 3D model file. To ensure that the secret key for decrypting the 3D model file is only usable by the authorized consumer, the secret key may itself be encrypted before it is provided to the consumer. In some implementations, asymmetric encryption techniques may be used to encrypt the secret key. For example, the content provider's 3D printer may be equipped with a tamper-resistant cryptographic module that stores, manages, and/or generates keys. The cryptographic module may generate a private-public key pair. A record of the public key and its corresponding consumer or computing device (e.g., 3D printer) can be posted to the distributed ledger and propagated to the respective instances of the ledger maintained at each of the nodes in the network. In some implementations, the consumer's public key may be stored at a location off the ledger, but may nonetheless be accessible by the content provider to use in encrypting the secret key. In some implementations, the consumer's public key may not be widely distributed, but may instead be provided specifically to a particular content provider as part of the consumer's request for authorization to use the content provider's 3D model file. The encrypted key can then be provided to the consumer (stage 416).

At stage 418, the computing device associated with the consumer receives the encrypted secret key. At stage 420, the computing device associated with the consumer decrypts the secret key sent from the content provider, and in turn uses the secret key to decrypt the 3D model file. In some implementations, the consumer's computing device may be a 3D printer that includes a controller having a tamper-resistant cryptographic module. The cryptographic module can decrypt the secret key from the content provider using a private key stored in the cryptographic module. In some implementations, where the secret key was encrypted based on a public key associated with the consumer's 3D printer, the cryptographic module can decrypt the secret key using a private key associated with the consumer's 3D printer, which complements the public key in an asymmetric public-private key pair. With the secret key decrypted, the cryptographic module can then apply the secret key to decrypt the 3D model file. In some implementations, the cryptographic module may include software and hardware components that are designed to interfere with attempts to tamper with the encryption or decryption capabilities of the printer and to guard against the possibility of unauthorized creation, reading, or modification of keys.

At stage 422, one or more computing devices associated with the consumer may execute the decrypted file. For example, a 3D printer may load the decrypted 3D model file into a memory of the computer and use the file to print one or more samples of a 3D model. The file may include data characterizing the 3D model in a format that is recognized by the 3D printer so as to allow use of the file to print the samples. In some implementations, the consumer may have been granted a limited right to use the 3D model file. The content provider may have imposed temporal restrictions on the file, for example, which prevent use of the file beyond a certain period of time. The content provider may also, in addition or in the alternative, impose restrictions on the number of uses that can be made of the file. For example, a use restriction may limit the consumer to printing a 3D model only once or twice without being charged again for additional uses. In some implementations, temporal or maximum use restrictions can be implemented by sending a token to the consumer's device that includes a timestamp or data indicating a maximum number of permissible uses. The 3D printer may check the token each time an attempt is made to execute the 3D model file, and if any conditions set by the token are not satisfied, the 3D model file may be unusable.

In some implementations, a tamper-resistant cryptographic module on the consumer's device may prevent the consumer or other persons from removing the private key stored by the module, or the private key may be uniquely tied to the hardware of the cryptographic module. In this way, the private key cannot be shared with other consumers who may also be interested in making use of an encrypted 3D model file, because the other consumers are unable to obtain or use the authorized consumer's private key, which may be a prerequisite to use the content provider's key for decrypting the 3D model file.

In some implementations, one or more computers associated with the consumer can alert the content provider upon the occurrence of one or more events (stage 424). The content provider may use the alerts to track usage of the provider's files. In some implementations, an alert from a consumer may cause one or more computers associated with the content provider to automatically re-encrypt the 3D model file (e.g., to re-encrypt the file stored on a distributed file system from which consumers can obtain the 3D model file). As such, a subsequent consumer who is interested in using the 3D model file may retrieve the re-encrypted file. However, because the re-encrypted file may require a new secret key to decrypt the file, a previous key that was used by another consumer would be incapable of decrypting the file. Regular file re-encryption can therefore minimize the likelihood of unauthorized uses of the file. In some implementations, the consumer can generate an alert that triggers re-encryption of a file in response to detecting that a use (e.g., printing) of the file has initiated, a use of the file has completed, a predetermined number (e.g., 1, 2, or more) of uses of the file has completed, confirmation that the consumer has successfully received the encrypted secret key for decrypting the 3D model file, confirmation that the consumer has decrypted the secret key, confirmation that the consumer has decrypted the 3D model file, or a combination of these.

In some implementations, a 3D model file may be re-encrypted from time to time even in the absence of a triggering event from the consumer. For example, a computing system associated with the content provider may run a timer for a predefined length of time. At the expiration of such time, the content provider's computing system (or the computing system that hosts the encrypted 3D model file, for example), may automatically re-encrypt the file. In some implementations, the timer may be automatically reset after each re-encryption, including after a re-encryption resulting from a consumer-provided alert. These operations are represented in stages 426 and 428 of process 400, for example.

Figure 5:
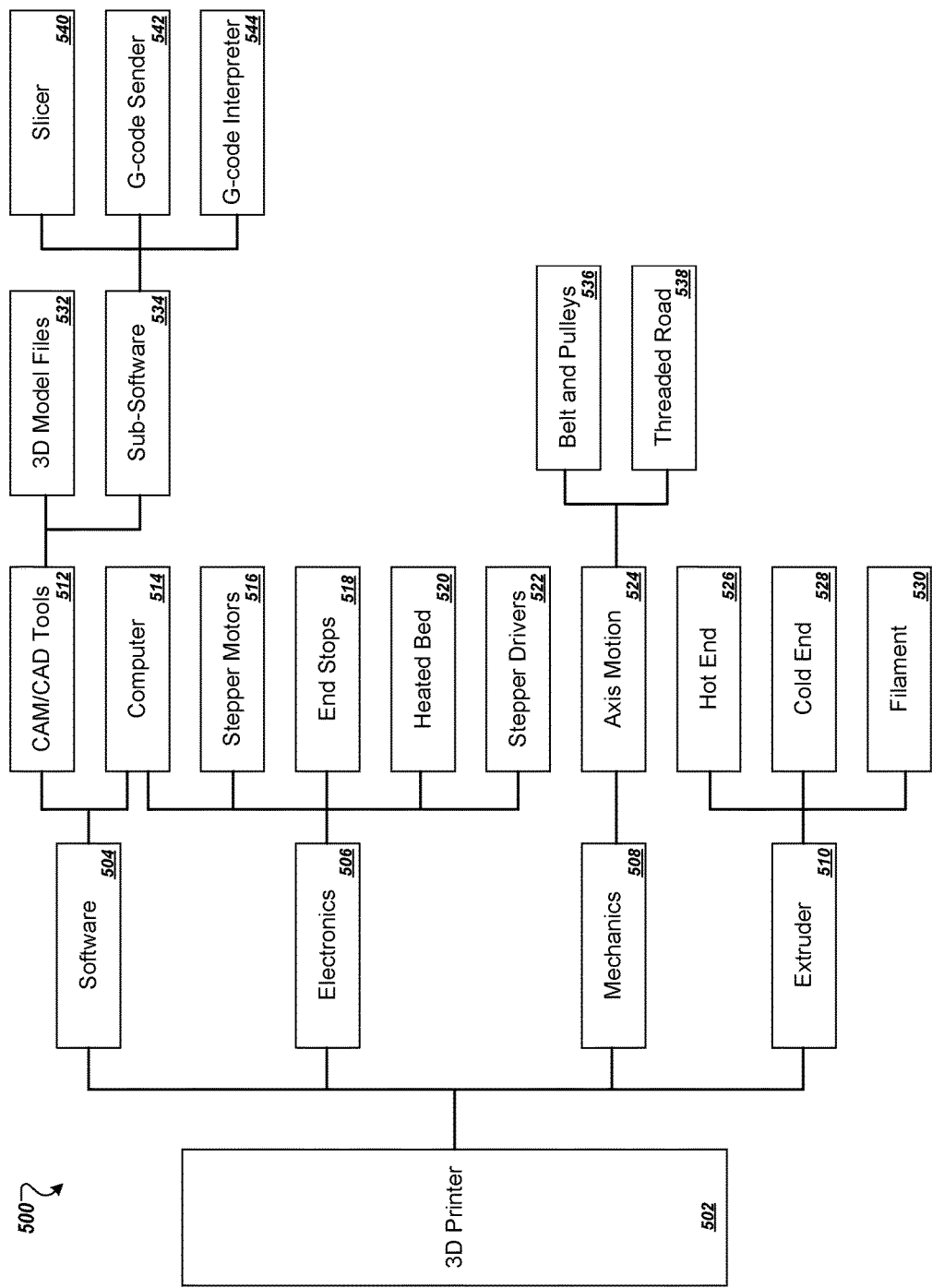
FIG. 5 depicts a block diagram of an example 3D printing device that is operable to access and use 3D model files made available for sharing based on a distributed ledger.

FIG. 5 depicts a block diagram 500 of an example 3D printing device 502 that is configured to access and use 3D model files made available through a distributed ledger. The block diagram 500 shows functional and structural blocks of the example 3D printing device 502, and associated components such as CAD software for creating 3D models. The 3D printing device 502 is generally capable of making three dimensional solid objects based on a digital 3D model file. In some implementations, the 3D printing device uses an additive process to print a 3D object in which successive layers of material are precisely deposited in defined geometries until the 3D object is completed. Each layer of deposited material is effectively a thin cross-sectional portion of the 3D object. Various types or categories of 3D printers have been developed, and the techniques described herein are generally capable of being implemented with devices in any of these categories. For example, printers based on stereolithography, digital light processing, laminated object manufacturing, selective laser melting, or fused deposition modeling may all be employed according to the techniques described herein. Additionally, although the components of the block diagram 500 are showed in a particular arrangement by way of example, other arrangements are contemplated.

The 3D printing device 502 includes a collection of software components 504, electronic components 506, mechanical components 508, and an extruder 510. In some implementations, the extruder 510 may be represented within the mechanical components 508, and other representations are possible as well. The software components 504 include CAM/CAD tools 512 and a computer 614. The CAM/CAD tools 512 provide a user interface for content creators to design and modify 3D objects. The objects designed with the CAM/CAD tools 512 can be saved as a 3D model file 532 in a format that is usable by a 3D printing device 502 to print the object. Additional software components of the CAM/CAD tools 512 can include a slicer 540, a G-code sender 542, and a G-code interpreter 544. The slicer 540 translates 3D drawings into individual layers that are to printed by the device 502. In some implementations, the slicer 540 can convert a 3D drawing into G-code in a numerical control programming language that can be read and executed by the 3D printer to control the printing of an object. The G-code sender 542 streams control code to the printing device and the G-code interpreter 544 interprets and executes the code.

The software 504 can also include, for example, instructions that are stored and executed in the computer 514. All or a portion of the computer 514 may be embedded in the 3D printer 502 itself, or may be associated and in communication with the 3D printer 502 (e.g., over a short-length cable, a local area network, a wide area network, or the Internet). The computer 514 may include all or some of the components of the controller 202 depicted in FIG. 2. For example, the computer 514 may include a controller, a cryptographic module, a network/communications interface, and a copy of a distributed ledger. In some implementations, the computer 514 may act as a node in a computing network that maintains the distributed ledger by consensus of multiple nodes in the network. The computer 514 may be implemented by computer hardware, such as that described with respect to FIGS. 2 and 5.

The electronics 506 of the 3D printing device 502 may include, for example, stepper motors 516, end stops 518, a heated bed 520, and stepper drivers 522. The stepper drivers 522 provide power to the stepper motors 516 to finely control motion of a printing head (i.e., the extruder 510) of the device 502. The end stops 518 provide positional references for the printing head. The heated bed 520 provides a platform on which a printed object can be formed. A surface of the bed 520 provides even heating to an object being formed on the bed 520 during printing so as to reduce a likelihood of warping of the deposited material in the object (e.g., plastic).

The mechanical components 508 of the 3D printing device 502 include parts that enable motion of a printing head in three-dimensions to deposit printing material in layers. These parts may include, for example, belts and pulleys 536 and threaded road 538.

The extruder 510 is generally designed to deposit materials in successive layers to form a three-dimensional object. The extruder 510 is what actually prints an object and is analogous to a print head on a conventional (e.g., inkjet) printer. The extruder 510 includes a hot end 526 and a cold end 528. The hot end 526 melts, for example, a plastic filament 530 that is fed into the extruder 510 and deposits the melted plastic on the printed part. The hot end 526 of the extruder 510 may include a nozzle, a heating cartridge, and a barrel, which are collectively enabled to feed filament to the extruder, heat the filament, and deposit heated material onto an object being printed.

Figure 6:
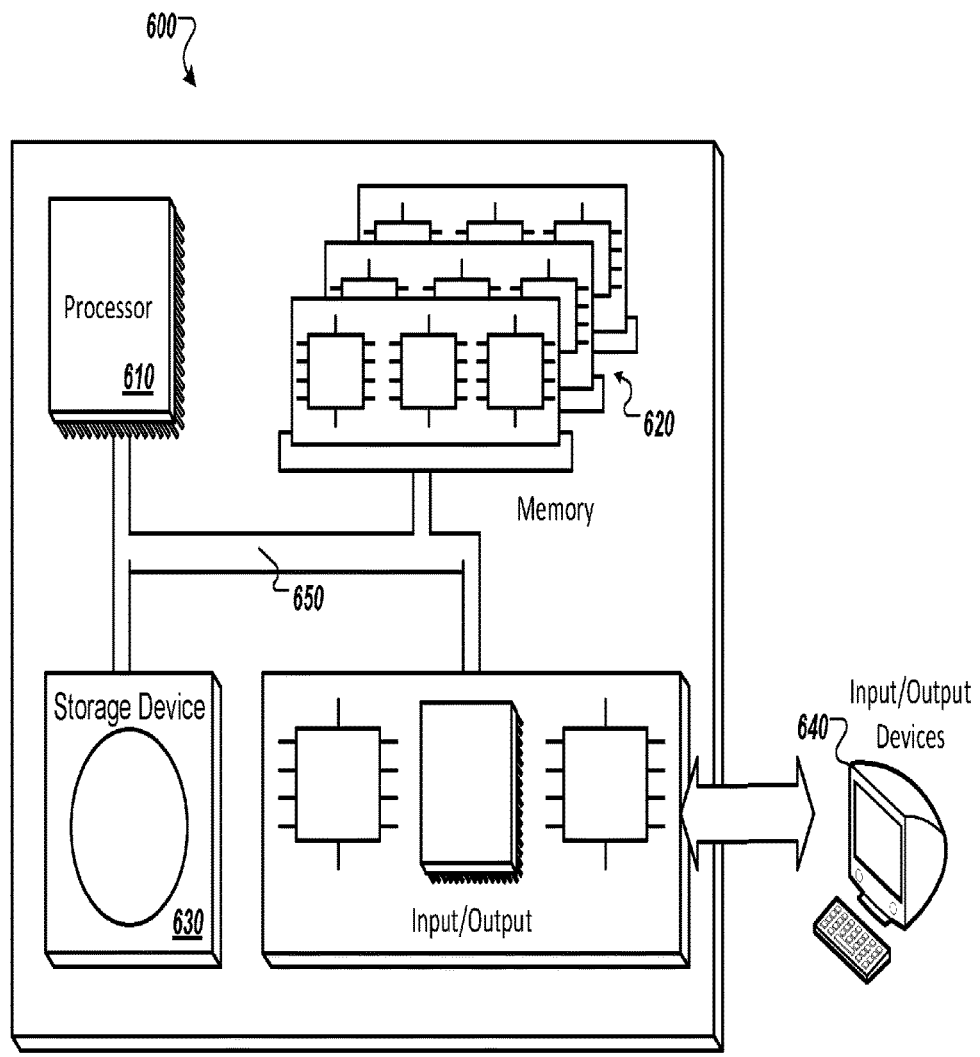
FIG. 6 depicts a schematic diagram of an example computer system that can be used to perform the operations associated with the computer-implemented methods and other techniques described herein.

FIG. 6 is a schematic diagram of a computer system 600. The system 600 can be used to carry out the operations described in association with any of the computer-implemented methods described previously, according to one implementation. A controller of a 3D printer may include elements of the system 600, for example. The system 600 is intended to include various forms of digital computers, such as laptops, desktops, workstations, personal digital assistants, servers, blade servers, mainframes, and other appropriate computers. The system 600 can also include mobile devices, such as personal digital assistants, cellular telephones, smartphones, and other similar computing devices. Additionally the system can include portable storage media, such as, Universal Serial Bus (USB) flash drives. For example, the USB flash drives may store operating systems and other applications. The USB flash drives can include input/output components, such as a wireless transmitter or USB connector that may be inserted into a USB port of another computing device.

The system 600 includes a processor 610, a memory 620, a storage device 630, and an input/output device 640. Each of the components 610, 620, 630, and 640 are interconnected using a system bus 650. The processor 610 is capable of processing instructions for execution within the system 600. The processor may be designed using any of a number of architectures. For example, the processor 610 may be a CISC (Complex Instruction Set Computers) processor, a RISC (Reduced Instruction Set Computer) processor, or a MISC (Minimal Instruction Set Computer) processor.

In one implementation, the processor 610 is a single-threaded processor. In another implementation, the processor 610 is a multi-threaded processor. The processor 610 is capable of processing instructions stored in the memory 620 or on the storage device 630 to display graphical information for a user interface on the input/output device 640.

The memory 620 stores information within the system 600. In one implementation, the memory 620 is a computer-readable medium. In one implementation, the memory 620 is a volatile memory unit. In another implementation, the memory 620 is a non-volatile memory unit.

The storage device 630 is capable of providing mass storage for the system 400. In one implementation, the storage device 630 is a computer-readable medium. In various different implementations, the storage device 630 may be a floppy disk device, a hard disk device, an optical disk device, or a tape device.

The input/output device 640 provides input/output operations for the system 400. In one implementation, the input/output device 640 includes a keyboard and/or pointing device. In another implementation, the input/output device 640 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer. Additionally, such activities can be implemented via touchscreen flat-panel displays and other appropriate mechanisms.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include a local area network ("LAN"), a wide area network ("WAN"), peer-to-peer networks (having ad-hoc or static members), grid computing infrastructures, and the Internet.

The computer system can include clients and servers. A client and server are generally remote from each other and typically interact through a network, such as the described one. The relationship of client and server arises by virtue of computer programs running on the respective computers and having a client-server relationship to each other.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method, comprising:
    accessing an electronic ledger that identifies a plurality of 3D model files that have been made available for distribution,
        wherein the electronic ledger comprises a blockchain,
        wherein respective instances of the electronic ledger are separately maintained by each of a plurality of nodes in a computing network;
    obtaining, by a computing device using information contained in the electronic ledger, a particular 3D model file among the plurality of 3D model files identified in the electronic ledger, wherein the particular 3D model file obtained by the computing device was encrypted using a secret key;

requesting, by the computing device, the secret key that was used to encrypt the particular 3D model file, including invoking a computer program on the electronic ledger that corresponds to the particular 3D model file,
  wherein invoking the computer program on the electronic ledger prompts encryption of the secret key using a public key associated with the computing device,
  wherein the computer program comprises a smart contract that is stored on the blockchain;

obtaining, by the computing device, the encrypted secret key;

decrypting, using a private key associated with the computing device that corresponds to the public key, the encrypted secret key to recover the secret key;

after decrypting the encrypted secret key, decrypting the particular 3D model file using the secret key; and after decrypting the particular 3D model file, executing the particular 3D model file on the computing device to print a physical 3D object.

2. The computer-implemented method of claim 1, wherein the computing device comprises a 3D printer.

3. The computer-implemented method of claim 1, wherein the electronic ledger identifies 3D model files submitted for distribution by a plurality of 3D model providers.

4. The computer-implemented method of claim 1, wherein:
  the computing device is one of the plurality of nodes in the computing network that maintains an instance of the electronic ledger; and
  a first instance of the electronic ledger is stored at the computing device.

5. The computer-implemented method of claim 4, further comprising:
  receiving, by the computing device, requests from other computing devices to update the electronic ledger;
  validating, by the computing device, the requests from the other computing devices to update the electronic ledger; and
  in response to validating the requests from the other computing devices to update the electronic ledger, updating the first instance of the electronic ledger that is stored at the computing device according to the requests.

6. The computer-implemented method of claim 5, wherein validating the requests from the other computing devices comprises identifying at least a threshold degree of consensus among the plurality of nodes in the computing network that the electronic ledger should be updated.

7. The computer-implemented method of claim 1, wherein the electronic ledger includes, for each of the plurality of 3D model files, a ledger entry that (i) identifies a given 3D model provider that submitted the respective 3D model file for distribution and (ii) indicates a path to a location where the respective 3D model file is stored.

8. The computer-implemented method of claim 7, wherein:
  at least a subset of the plurality of 3D model files identified in the electronic ledger are stored in a distributed file system; and
  the paths indicated by the respective ledger entries for the at least the subset of the plurality of 3D model files identify the at least the subset of the plurality of 3D model files on the distributed file system.

9. The computer-implemented method of claim 1, further comprising recording on the electronic ledger an indication of a payment from a user of the computing device to a provider of the particular 3D model file, wherein the computing device obtains the encrypted secret key in response to verifying the payment.

10. The computer-implemented method of claim 1, further comprising:
  after executing the particular 3D model file, identifying a subsequent attempt to execute the particular 3D model file by the computing device; and
  blocking the subsequent attempt to execute the particular 3D model file based on at least one of (i) a temporal restriction associated with the particular 3D model file or (ii) a maximum use restriction associated with the particular 3D model file.

11. The computer-implemented method of claim 1, further comprising providing an alert from the computing device to one or more computers associated with a provider of the particular file based on identifying that at least one of the following conditions has occurred:
  (i) the computing device has completed executing the particular 3D model file,
  (ii) the computing device has obtained the secret key for decrypting the particular 3D model file,
  (iii) the computing device has decrypted the encrypted secret key, or
  (iv) the computing device has decrypted the particular 3D model file.

12. The computer-implemented method of claim 11, wherein the one or more computers associated with the provider of the particular 3D model file are configured to re-encrypt the particular 3D model file with a second secret key in response to receiving the alert from the computing device, wherein the second secret key is different than the secret key.

13. The computer-implemented method of claim 1, wherein the secret key is generated by one or more computers associated with a provider of the particular 3D model file that submitted the particular 3D model file for distribution on the distributed ledger.

14. The computer-implemented method of claim 1, wherein invoking the computer program on the electronic ledger further causes generation of an entry on the electronic ledger, the entry including data representing a record of the secret key being provisioned to the computing device, and
  the plurality of nodes in the computing network add a block of entries, including the entry, to the respective instances of the electronic ledger maintained by the plurality of nodes in response to the block of entries being validated by a sufficient number of nodes in the plurality of nodes that represent a consensus.

15. A three-dimensional (3D) printer comprising:
  a printer assembly that includes means for depositing layered material to form a 3D model;
  a network interface configured to communicate with a plurality of computing nodes in a peer-to-peer network;
  an electronic ledger stored on the 3D printer that identifies a plurality of 3D model files that have been made available for distribution, wherein the electronic ledger comprises a blockchain, wherein the electronic ledger is replicated on at least a subset of the plurality of computing nodes;
  a key manager configured to stored cryptographic keys; and a controller configured to:
  select a 3D model file identified in the electronic ledger;
  cause the network interface to obtain the selected 3D model file based on information indicated by the electronic ledger;
  request the secret key that was used to encrypt the selected 3D model file, including invoking a computer program on the electronic ledger that corresponds to the selected 3D model file, wherein the computer program comprises a smart contract, wherein invoking the computer program on the electronic ledger prompts encryption of the secret key using a public key associated with the 3D printer;
  obtain the encrypted secret key;
  decrypt the encrypted secret key to recover the secret key;
  decrypt the selected 3D model file using the recovered secret key; and
  cause the printer assembly to form the 3D model based on the decrypted 3D model file.

16. The 3D printer of claim 15, further comprising a tamper-resistant security module that includes hardware configured to interfere with attempts to modify or intercept cryptographic keys stored by the key manager.

17. One or more non-transitory computer-readable media having instructions stored thereon that, when executed by one or more physical processors of a computing device, cause performance of operations comprising:
  accessing an electronic ledger that identifies a plurality of 3D model files that have been made available for distribution,
    wherein the electronic ledger comprises a blockchain,
    wherein respective instances of the electronic ledger are separately maintained by each of a plurality of nodes in a computing network;
  obtaining, by the computing device using information contained in the electronic ledger, a particular 3D model file among the plurality of 3D model files identified in the electronic ledger, wherein the particular 3D model file obtained by the computing device was encrypted using a secret key;
  requesting, by the computing device, the secret key that was used to encrypt the particular 3D model file, including invoking a computer program on the electronic ledger that corresponds to the particular 3D model file,
    wherein invoking the computer program on the electronic ledger prompts encryption of the secret key using a public key associated with the computing device,
    wherein the computer program comprises a smart contract that is stored on the blockchain;
  obtaining, by the computing device, the encrypted secret key;
  decrypting, using a private key associated with the computing device that corresponds to the public key, the encrypted secret key to recover the secret key;
  after decrypting the encrypted secret key, decrypting the particular 3D model file using the secret key; and
  after decrypting the particular 3D model file, executing the particular 3D model file on the computing device to print a physical 3D object.

* * * * *